(12) United States Patent
Takasaki et al.

(10) Patent No.: US 12,288,145 B2
(45) Date of Patent: Apr. 29, 2025

(54) PARALLEL CROSS VALIDATION IN COLLABORATIVE MACHINE LEARNING

(71) Applicant: International Business Machines Corporation, Armonk, NY (US)

(72) Inventors: Kenichi Takasaki, Tokyo (JP); Shoichiro Watanabe, Tokyo (JP); Mari Abe Fukuda, Tokyo (JP); Sanehiro Furuichi, Tokyo (JP); Yasutaka Nishimura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 17/302,187

(22) Filed: Apr. 27, 2021

(65) Prior Publication Data
US 2022/0343219 A1    Oct. 27, 2022

(51) Int. Cl.
*G06F 9/38*  (2018.01)
*G06N 20/20*  (2019.01)
*H04L 67/00*  (2022.01)

(52) U.S. Cl.
CPC .......... *G06N 20/20* (2019.01); *G06F 9/3885* (2013.01); *H04L 67/34* (2013.01)

(58) Field of Classification Search
CPC ...... G06N 20/20; G06N 20/00; G06F 9/3885; G06F 9/5066; G06F 9/5072; H04L 67/34; H04L 67/10
See application file for complete search history.

(56) References Cited

U.S. PATENT DOCUMENTS

2015/0019214 A1*   1/2015  Wang ..................... G06N 3/02
                                                        704/232
2016/0217387 A1*   7/2016  Okanohara ............ G06N 20/00
(Continued)

FOREIGN PATENT DOCUMENTS

WO    2020229684 A1    11/2020

OTHER PUBLICATIONS

Duan, et al., "Astraea: Self-balancing Federated Learning for Improving Classification Accuracy of Mobile Deep Learning Applications", arXiv:1907.01132v2, May 8, 2020, 9 pages, <https://arxiv.org/abs/1907.01132v2>.
(Continued)

*Primary Examiner* — Kc Chen
(74) *Attorney, Agent, or Firm* — Shackelford, McKinley & Norton, LLP

(57) ABSTRACT

A computer-implemented method, a computer program product, and a computer system for parallel cross validation in collaborative machine learning. A server groups local models into groups. In each group, each local device uses its local data to validate accuracies of the local models and sends a validation result to a group leader or the server. The group leader or the server selects groups whose variances of the accuracies are not below a predetermined variance threshold. In each selected group, the group leader or the server compares an accuracy of each local model with an average value of the accuracies and randomly selects one or more local models whose accuracies do not exceed a predetermined accuracy threshold. The server obtains weight parameters of selected local models and updates the global model based on the weight parameters.

17 Claims, 10 Drawing Sheets

(56) References Cited

U.S. PATENT DOCUMENTS

| | | | |
|---|---|---|---|
| 2020/0293887 A1 | 9/2020 | De Brouwer | |
| 2021/0097439 A1* | 4/2021 | Vodencarevic | G06F 18/214 |
| 2021/0406782 A1* | 12/2021 | Nakayama | G06F 16/27 |
| 2022/0044162 A1* | 2/2022 | Zhang | G06F 21/64 |
| 2022/0052925 A1* | 2/2022 | Vandikas | G06N 3/04 |

OTHER PUBLICATIONS

Kairouz, et al., "Advances and Open Problems in Federated Learning", arXiv:1912.04977v3, Mar. 9, 2021, 121 pages, <https://arxiv.org/pdf/1912.04977.pdf>.

McMahan, et al., "Communication-Efficient Learning of Deep Networks from Decentralized Data", arXiv:1602.05629v3, Feb. 28, 2017, 11 pages, <https://arxiv.org/pdf/1602.05629.pdf>.

McMahan, et al., "Federated Learning: Collaborative Machine Learning without Centralized Training Data", Google AI Blog, Apr. 6, 2017, 4 pages, <https://ai.googleblog.com/2017/04/federated-learning-collaborative.html>.

Mell, et al., "The NIST Definition of Cloud Computing", National Institute of Standards and Technology, Special Publication 800-145, Sep. 2011, 7 pages.

Xie, et al., "Practical Distributed Learning: Secure Machine Learning with Communication-Efficient Local Updates", arXiv:1903.06996v1, Mar. 16, 2019, 13 pages, <https://arxiv.org/pdf/1903.06996v1.pdf>.

Yang, et al., "Applied Federated Learning: Improving Google Keyboard Query Suggestions", arXiv:1812.02903v1, Dec. 7, 2018, 9 pages, <https://arxiv.org/pdf/1812.02903.pdf>.

Yin, et al., "FEDLOC: Federated Learning Framework for Data-Driven Cooperative Localization and Location Data Processing", arXiv:2003.03697v2, May 25, 2020, 27 pages, <https://arxiv.org/abs/2003.03697v2>.

* cited by examiner

PARALLEL CROSS VALIDATION IN COLLABORATIVE MACHINE LEARNING

The present invention relates generally to machine learning, and more particularly to parallel cross validation in collaborative machine learning.

In the field of machine learning, federated learning attracts attention in which a versatile global model is produced by integrating several local models and redistributed to the local models to allow relearning with local data. Federated learning does not require sharing of local data and makes it possible to prevent excessive data transmission and data leakage because only model parameters are sent to a server. However, it is concerned that that extremely biased local data from a single device or several devices may degrade versatility and reliability of a global model.

McMahan et. al. (Communication-Efficient Learning of Deep Networks from Decentralized Data, arXiv: 1602.05629v3, 2017) discloses a method for the federated learning of deep networks based on iterative model averaging. Kairouz et. al. (Advances and Open Problems in Federated Learning, arXiv:1912.04977v1, 2019) discusses bias in training data. Xie et. al. (Practical Distributed Learning: Secure Machine Learning with Communication-Efficient Local Updates, arXiv:1903.06996v1, 2019) discloses a federated learning algorithm that protects the global model from data poisoning. Yang et. al. (Applied Federated Learning: Improving Google Keyboard Query Suggestions, arXiv: 1812.02903v1, 2018) shows data of eval loss and training example count over time; as shown in the disclosure, training example count is highest in the evening as more devices are available, while eval loss is highest during the day when few devices are available.

SUMMARY

In one aspect, a computer-implemented method for parallel cross validation in collaborative machine learning is provided. The computer-implemented method includes, in each group of local models, receiving, by each local device, local models from other local devices, such that the each local device has all local models in one group; validating, by the each local device using local data thereon, accuracies of the all local models and a global model received from a server; and sending, by the each local device, a validation result to a group leader. The computer-implemented method further includes selecting, by group leaders of respective groups, groups whose variances of the accuracies are not below a predetermined variance threshold. The computer-implemented method further includes, in each selected group, comparing, by the group leader, an accuracy of each local model and an average value of the accuracies and randomly selecting one or more local models whose accuracies do not exceed a predetermined accuracy threshold. The computer-implemented method further includes sending to the server, by the leader, weight parameters of selected local models. Based on the weight parameters, the server updates the global model.

In another aspect, a computer program product for parallel cross validation in collaborative machine learning is provided. The computer program product comprises a computer readable storage medium having program instructions embodied therewith, and the program instructions are executable by one or more processors. The program instructions are executable to: in each group of local models, receive, by each local device, local models from other local devices, such that the each local device has all local models in one group; validate, by the each local device using local data thereon, accuracies of the all local models and a global model received from a server; and send, by the each local device, a validation result to a group leader. The program instructions are further executable to select, by group leaders of respective groups, groups whose variances of the accuracies are not below a predetermined variance threshold. For each selected group, the program instructions are further executable to compare, by the group leader, an accuracy of each local model with an average value of the accuracies. For each selected group, the program instructions are further executable to randomly select, by the group leader, one or more local models whose accuracies do not exceed a predetermined accuracy threshold. The program instructions are further executable to send to the server, by the leader, weight parameters of selected local models. The server updates the global model, based on the weight parameters.

In yet another aspect, a computer system for parallel cross validation in collaborative machine learning is provided. The computer system comprises one or more processors, one or more computer readable tangible storage devices, and program instructions stored on at least one of the one or more computer readable tangible storage devices for execution by at least one of the one or more processors. The program instructions are executable to: in each group of local models, receive, by each local device, local models from other local devices, such that the each local device has all local models in one group; in the each group, validate, by the each local device using local data thereon, accuracies of the all local models and a global model received from a server; in the each group, send, by the each local device, a validation result to a group leader; select, by group leaders of respective groups, groups whose variances of the accuracies are not below a predetermined variance threshold; in each selected group, compare, by the group leader, an accuracy of each local model with an average value of the accuracies; in the each selected group, randomly select, by the group leader, one or more local models whose accuracies do not exceed a predetermined accuracy threshold; and send to the server, by the leader, weight parameters of selected local models. Based on the weight parameters, the server updates the global model.

In yet another aspect, a computer-implemented method for parallel cross validation in collaborative machine learning is provided. The computer-implemented method includes grouping, by a server, local models on respective ones of local devices into groups, where, in each group, each local device receives local models from other local devices such that the each local device has all local models in one group. The computer-implemented method further includes receiving from each local device, by the server, a validation result, wherein the each local device uses local data thereon to validate accuracies of all local models and a global model received from the server. The computer-implemented method further includes selecting, by the server, groups whose variances of the accuracies are not below a predetermined variance threshold. The computer-implemented method further includes, for each selected group, comparing, by the server, an accuracy of each local model and an average value of the accuracies. The computer-implemented method further includes, for the each selected group, randomly selecting, by the server, one or more local models whose accuracies do not exceed a predetermined accuracy threshold. The computer-implemented method further includes obtaining, by the server, weight parameters of selected local models. The computer-implemented method further includes updating, by the server, the global model, based on the weight parameters.

In another aspect, a computer program product for parallel cross validation in collaborative machine learning is provided. The computer program product comprises a computer readable storage medium having program instructions embodied therewith, and the program instructions are executable by one or more processors. The program instructions are executable to: group, by a server, local models on respective ones of local devices into groups, wherein, in each group, each local device receives local models from other local devices such that the each local device has all local models in one group; receive from each local device, by the server, a validation result, wherein the each local device uses local data thereon to validate accuracies of the all local models and a global model received from the server; select, by the server, groups whose variances of the accuracies are not below a predetermined variance threshold; for each selected group, compare, by the server, an accuracy of each local model with an average value of the accuracies; for the each selected group, randomly select, by the server, one or more local models whose accuracies do not exceed a predetermined accuracy threshold; obtain, by the server, weight parameters of selected local models; and update, by the server, the global model, based on the weight parameters.

DETAILED DESCRIPTION

Embodiments of the present invention disclose a method of exchanging parameters (weighting matrices) of local models before integration into a global model in collaborative machine learning and evaluating accuracies of these models. In the embodiments of the present invention, data bias is detected in advance without sharing local data and metadata containing confidential information in a central server or the like, thus versatility and reliability of the global model are secured.

Embodiments of the present invention include following features. Any local models sorted into a group are exchanged before integration into a global model. Existing local data is inputted to exchanged models to evaluate their outputs. Extremely biased data is detected in local models. Only local models with secured reliability resulting from the evaluation are treated as subjects taken into a global model.

Figure 1:
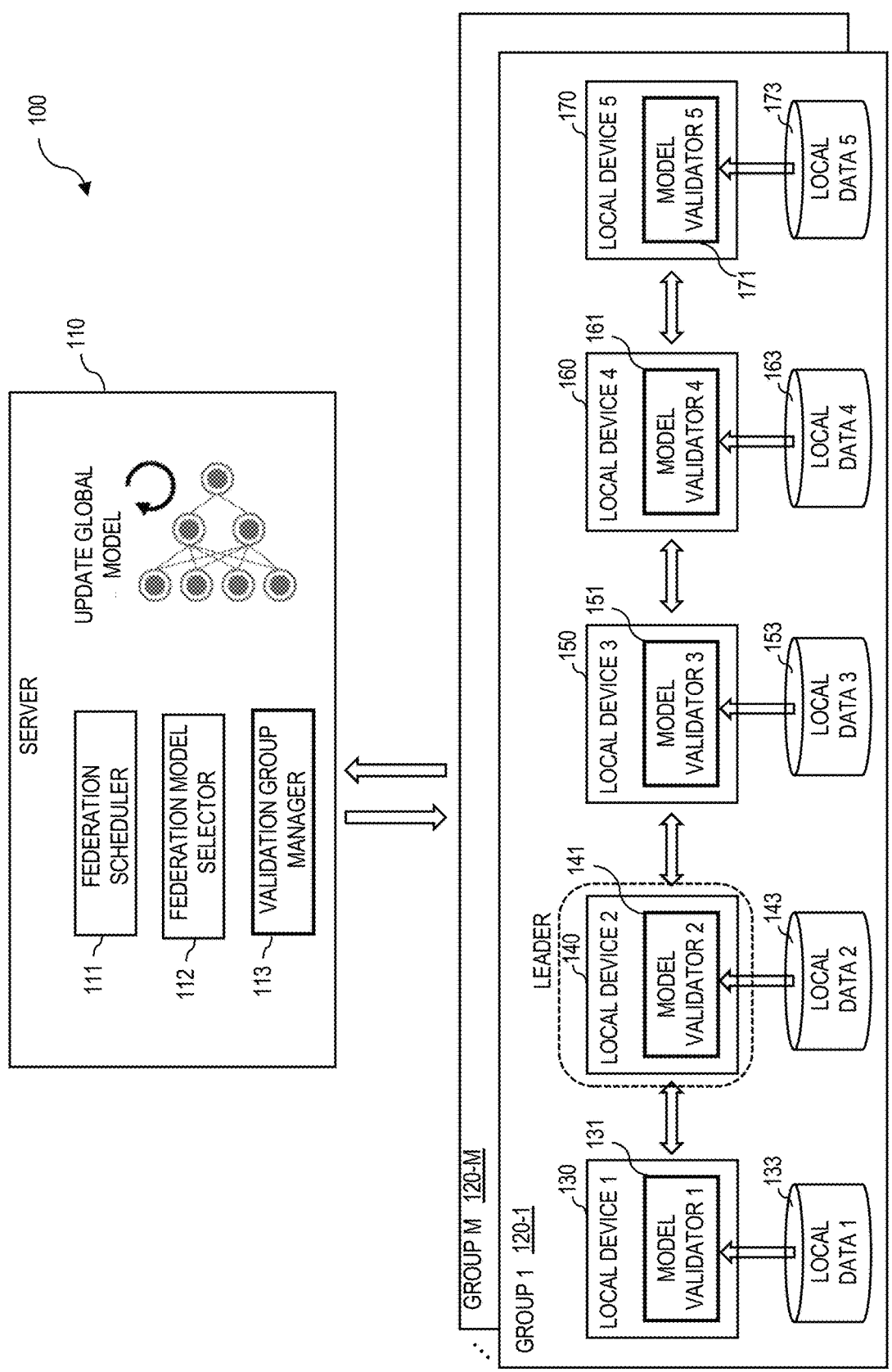
FIG. 1 is a systematic diagram illustrating a system for parallel cross validation in federated learning, in accordance with one embodiment of the present invention.

FIG. 1 is a systematic diagram illustrating system 100 for parallel cross validation in federated learning, in accordance with one embodiment of the present invention. It should be appreciated that a method for parallel cross validation in federated learning shown in FIG. 1 can be used not only for federated learning but also for other collaborative learning algorithms with multiple models on respective devices.

System 100 includes server 110 which is a central server for federated learning. Server 110 may reside on one or more computing devices or servers. A computing device or server is described in more detail in later paragraphs with reference to FIG. 7. Server 110 may be implemented in a cloud computing environment. Later paragraphs with reference to FIG. 8 and FIG. 9 describe the cloud computing environment in detail.

In additional to existing techniques in federated learning, such as federation scheduler 111 and federation model selector 112 shown in FIG. 1, server 110 further includes a component in the present invention—validation group manager 113 for grouping local models on respective local devices. Server 110 sends a global model to the respective local devices, receives weight parameters of selected local models, and receives validation results from local devices. Server 110 also receives information about members in each group of local devices. Server 110 updates the global model using weight parameters of selected local models.

System 100 further includes a plurality of groups, from group 1 120-1 to group M 120-M shown in FIG. 1. Each group includes a plurality of local devices hosting respective local models. FIG. 1 illustrates that group 1 120-1 includes five local devices, namely local device 1 130, local device 2 140, local device 3 150, local device 4 160, and local device 5 170. For the purpose of illustration, FIG. 1 shows only five local devices; it should be appreciated that a group may include any number of local devices. Similar to group 1 120-1, each of other groups includes a certain number of local devices.

A respective one of the local devices may be a computing device, for example a desktop computer and a mobile device. A respective one of the local devices may be any electronic device or computing system capable of receiving input from a user, executing computer program instructions, and communicating with another computing system via a network. The computing device is described in more detail in later paragraphs with reference to FIG. 7.

System 100 may be implemented in a network that can be any combination of connections and protocols which support communications among the local devices and the central server. For example, the network may be the Internet which represents a worldwide collection of networks and gateways to support communications between devices connected to the Internet; the network may be implemented as an intranet, a local area network (LAN), a wide area network (WAN), and a wireless network.

Each of the local devices includes a model validator which is responsible for using its own local data to validate accuracies of all the models in the group and a global model. FIG. 1 illustrates that local device 1 130 includes model validator 1 131 which uses local data 1 133 to validate the accuracies, local device 2 140 includes model validator 2 141 which uses local data 2 143 to validate the accuracies, local device 3 150 includes model validator 1 151 which uses local data 3 153 to validate the accuracies, local device 4 160 includes model validator 4 161 which uses local data 4 163 to validate the accuracies, and local device 5 170 includes model validator 5 171 which uses local data 5 173 to validate the accuracies.

Each of the local devices sends its local model to other local devices in the same group. For example, in group 1 120-1, local device 1 130 sends its local models to local device 2 140, local device 3 150, local device 4 160, and local device 5 170; furthermore, local device 1 130 receives a local model from local device 2 140, a local model from local device 3 150, a local model from local device 4 160, and a local model from local device 5 170. Thus, model validator 1 131 on local device 1 130 validates, using local data 1 133, five local models received from other devices in group 1 120-1 and the global model received from server 110; similar to model validator 1 131 on local device 1 130, a model validator in each of other devices in the group validates the five local models and the global model, using its own local data.

In the embodiment shown in FIG. 1, a local device (i.e., local device 2 140) is selected as a leader of group 1 120-1. Local device 2 140 as the leader is responsible for collect validation results from other local device as well as from itself, analyzes accuracies of all the models in group 1 120-1, and uploads selected local models in group 1 120-1. Local device 2 140 as the leader may be selected by central server 110 or by devices in group 1 120-1. In another embodiment, no leader is selected in each group and a central server (i.e., server 110) takes the responsibilities mentioned above.

Figure 2A:
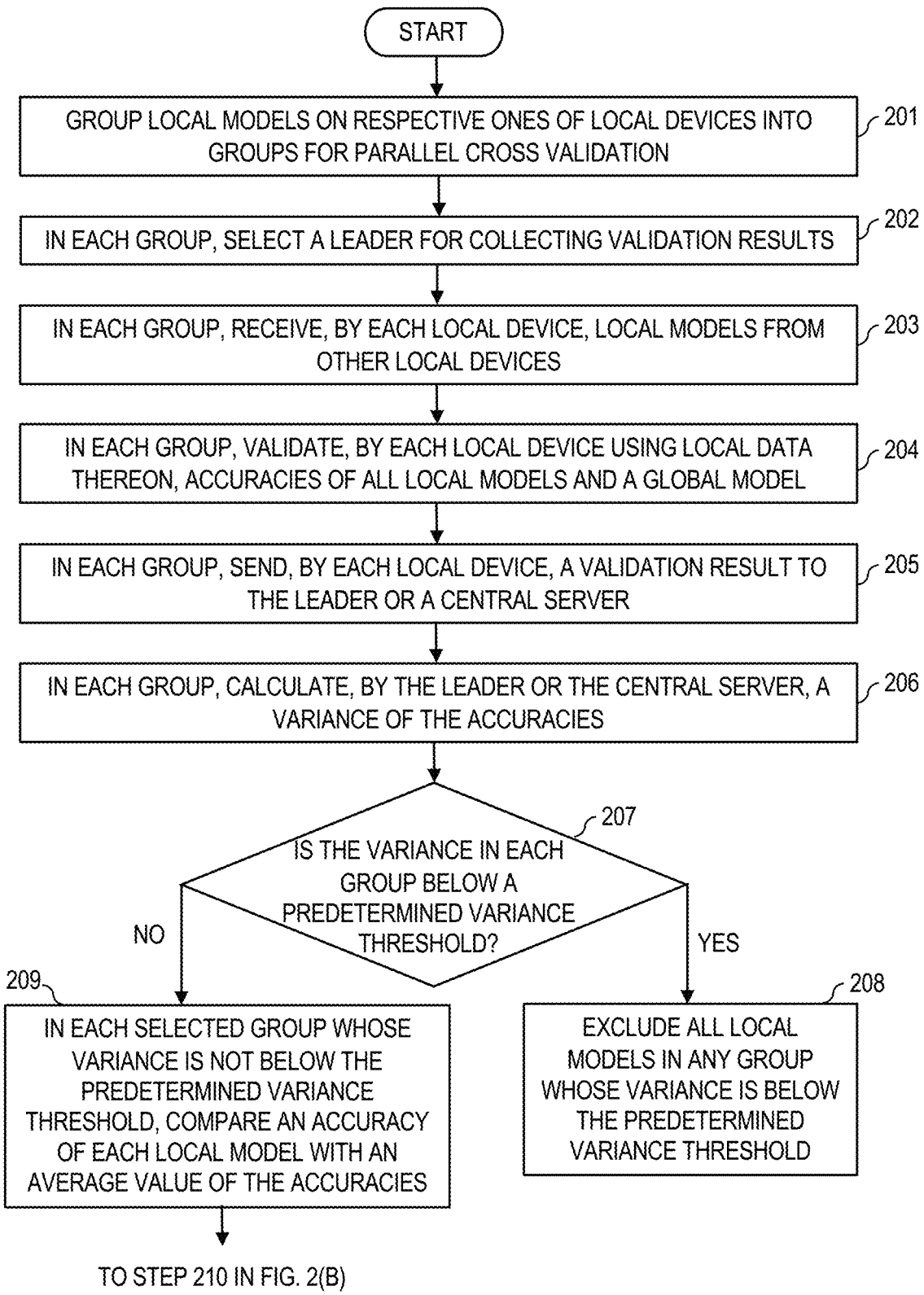
FIG. 2(A) and FIG. 2(B) present a flowchart showing operational steps of parallel cross validation in collaborative machine learning, in accordance with one embodiment of the present invention.
Figure 2B:
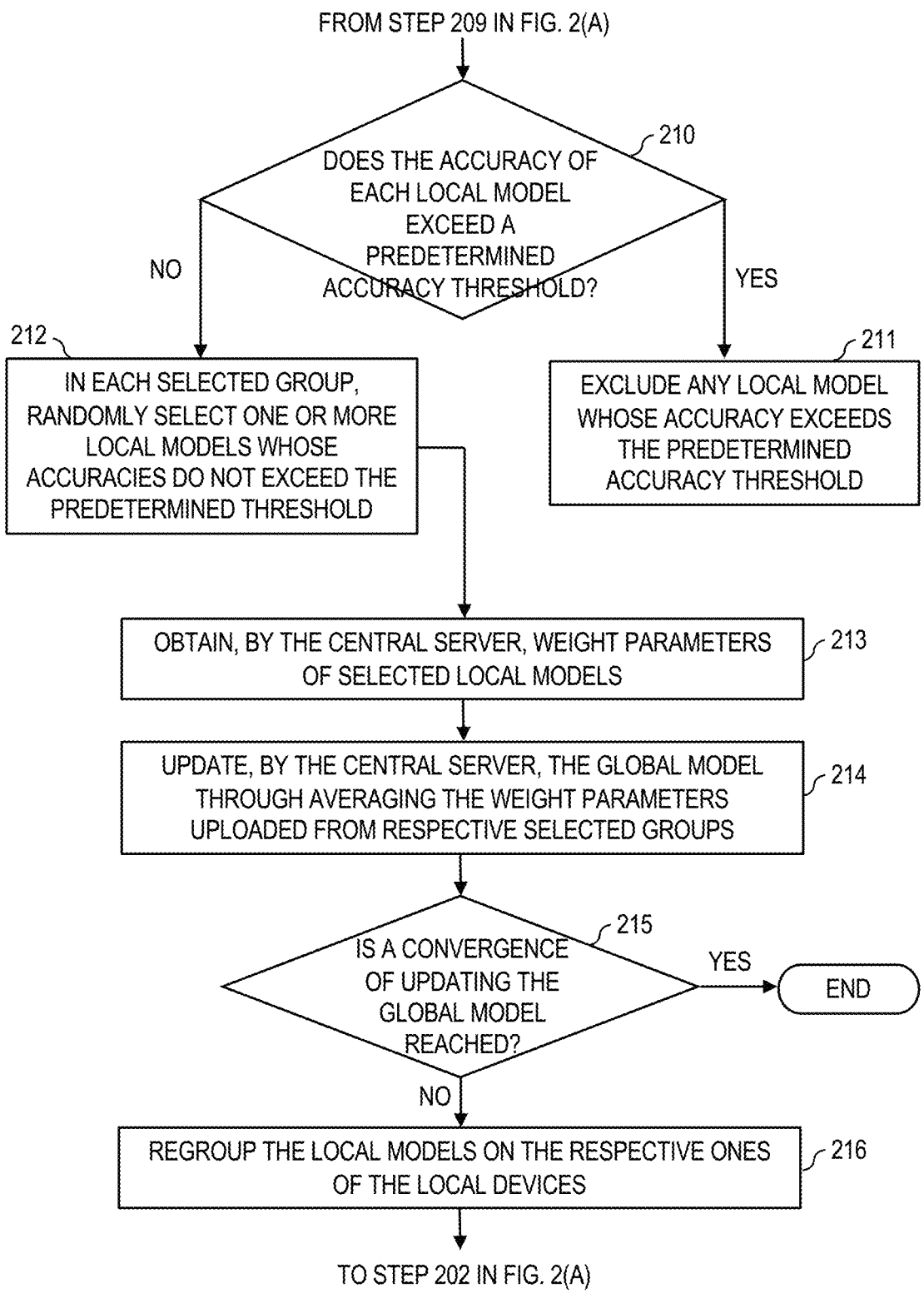

FIG. 2(A) and FIG. 2(B) present a flowchart showing operational steps of parallel cross validation in collaborative machine learning, in accordance with one embodiment of the present invention. Referring to FIG. 2(A), at step 201, a central server in collaborative machine learning groups local models on respective ones of local devices into groups for parallel cross validation. When the local models are grouped at first time (in a first cycle of the parallel cross validation), the central server groups the local models at random. In later cycles of the validation, the central server groups the local models in such a way that members of each group in a current cycle of the parallel cross validation do not overlap with members of each group in a previous cycle of the parallel cross validation.

Figure 3:
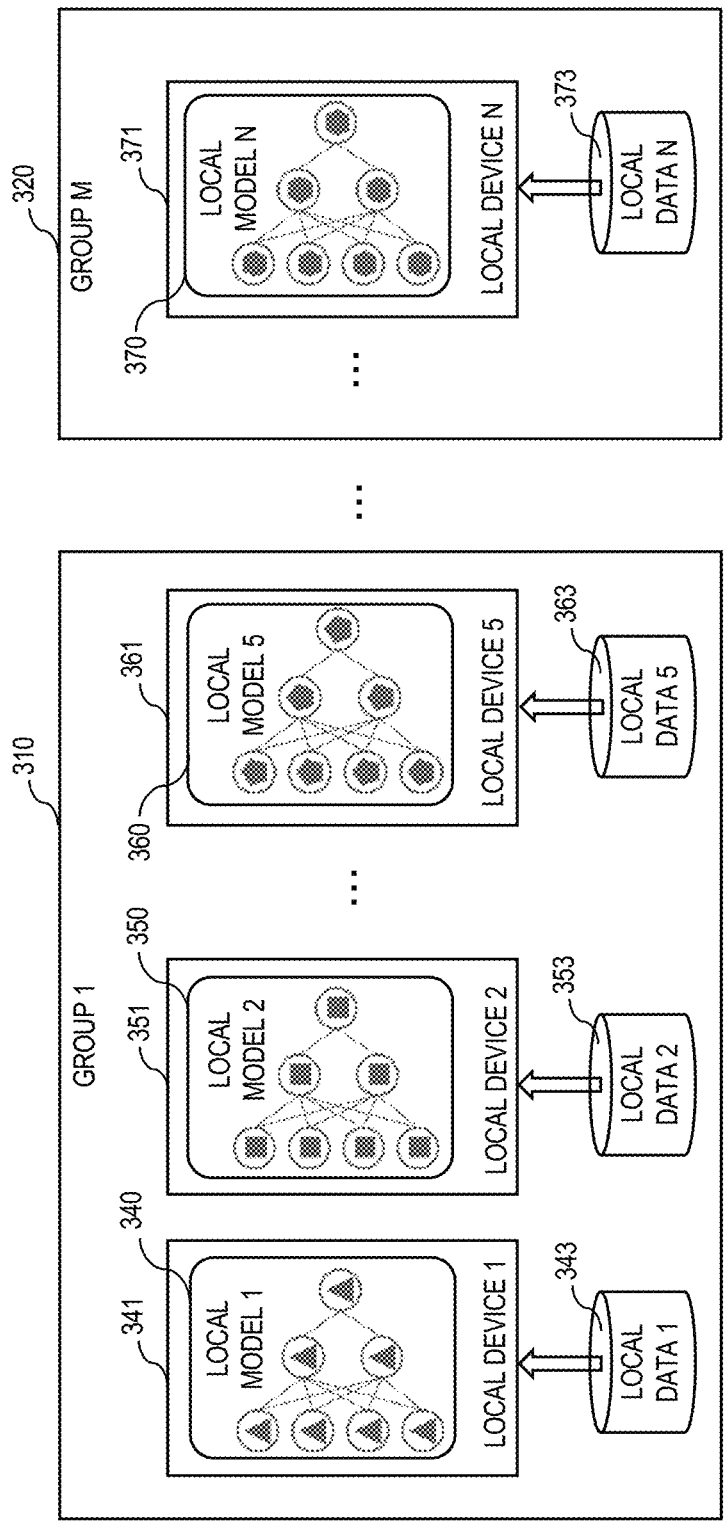
FIG. 3 illustrates grouping local models into groups, in accordance with one embodiment of the present invention.

FIG. 3 illustrates grouping local models into groups, in accordance with one embodiment of the present invention. FIG. 3 indicates that the central server groups the local models into M groups, and FIG. 3 illustrates group 1 310 and group M 320. As illustrated in FIG. 3, five local models (local model 1 340 on local device 1 341, local model 2 350 on local device 2 351, . . . , and local model 5 360 on local device 5 361) are grouped into group 1 310. In group 1 310, local device 1 341 will validate local models, using local data 1 343; local device 2 351 will validate local models, using local data 2 353; . . . , and local device 5 361 will validate local models, using local data 5 363. As illustrated in FIG. 3, local model N 370 on local device N 371 and other local models (not shown in FIG. 1) are grouped into group M 320; local device N 371 will validate local models, using local data N 373.

Referring back to FIG. 2(A), at step 202, a central server selects, in each group, a leader for collecting validation results. In the example shown in FIG. 1, local device 2 140 is selected as a leader of group 1 120-1. The leader may be selected by the central server or by local devices in each group. In another embodiment, no leader is selected; the central server (such as server 110) servers as a leader for all groups and is responsible for collecting validation results.

Referring to FIG. 2(A), at step 203, in each group, each local device receives local model from other local devices. Thus, each local device will have all local models in that group. At step 204, in each group, each local device uses local data thereon and validates accuracies of all local models and a global model.

Figure 4:
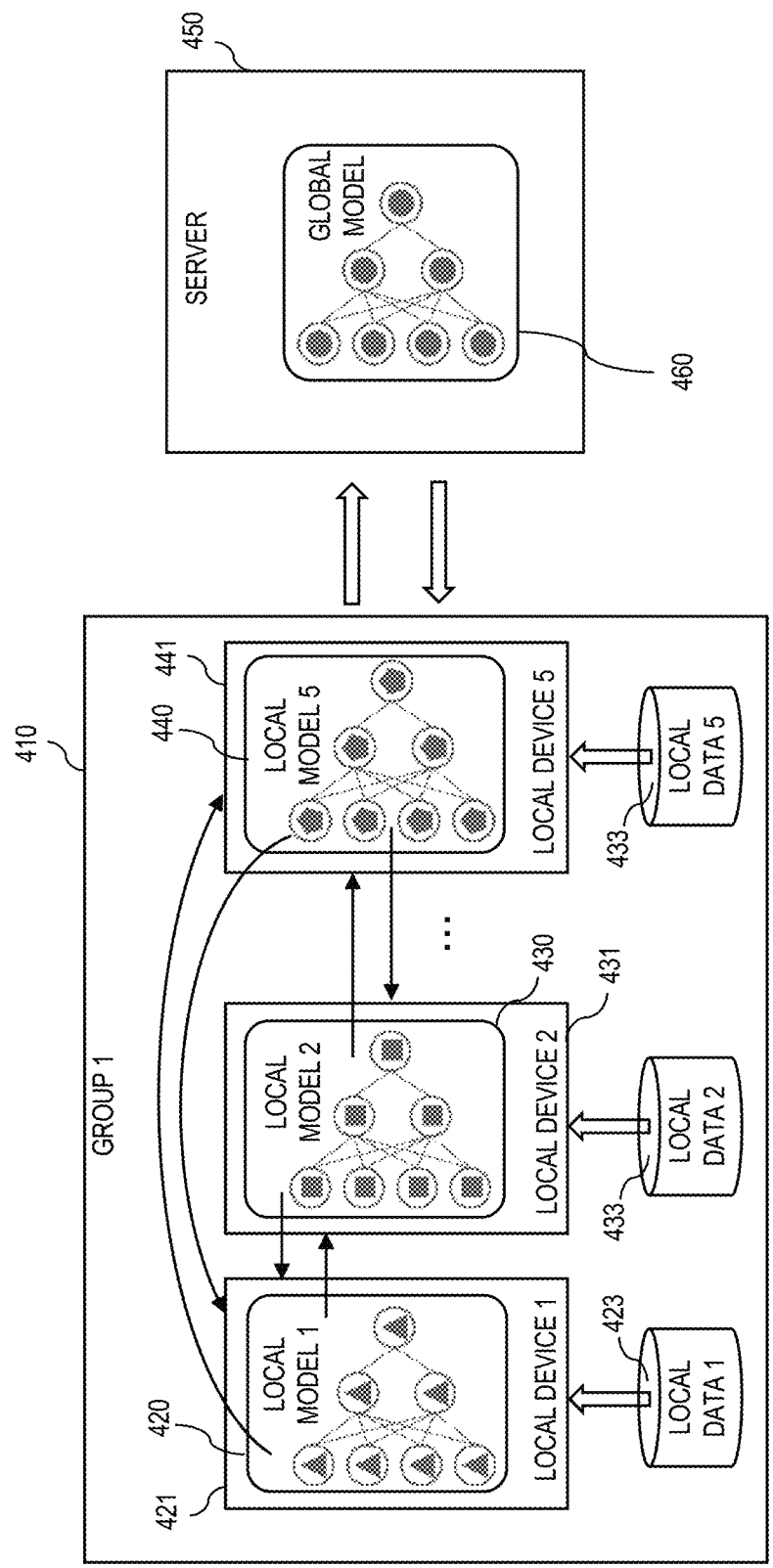
FIG. 4 illustrates that a model on one device is sent to all other devices in a group in order for all models to be validated on every device in the group, in accordance with one embodiment of the present invention.

FIG. 4 illustrates that a model on one device is sent to all other devices in a group in order for all models to be validated on every device in the group, in accordance with one embodiment of the present invention. Local model 1 420 on local device 1 421, local model 2 430 on local device 2 431, . . . , and local model 5 440 on local device 5 441 are grouped into group 1 410. Local device 1 421 sends local model 1 420 onto all other local devices in the group and receives local models from all other devices in the group. Similarly, all other devices do the same as local device 1 421. Thus, each of local device 1 421, local device 2 431, . . . , and local device 5 441 has all the local models (local model 1 420, local model 2 430, . . . , and local model 5 440). Each of local device 1 421, local device 2 431, . . . , and local device 5 441 validates all the local models and global model 460 received from server 450. To validate all the local models, local device 1 421, local device 2 431, . . . , and local device 5 441 use local data 1 423, local data 2 433, . . . , and local data 5 433, respectively.

Referring back to FIG. 2(A), at step 205, in each group, each local device sends a validation result to the leader or the central server. In the example shown in FIG. 1, local device 2 140 as the selected leader receives validation results from other local devices in the group. In another embodiment in which no leader is selected, all local devices in a group send validation results to the central server (such as server 110 shown in FIG. 1 or server 450 shown in FIG. 4).

Referring to FIG. 2(A), at step 206, in each group, the leader or the central server calculates a variance of the accuracies. At step 207 (decision block 207), the leader or the central server determines whether the variance below a predetermined variance threshold. In response to determining that the variance in a group is below the predetermined variance threshold (YES branch of decision block 207), at step 208, a leader of such a group or the central server excludes all local models in such a group whose variance is below the predetermined variance threshold. The group is determined to be invalid and all local models in such a group will excluded from uploading validation results to the central server. In response to determining that variances in respective groups are not below the predetermined variance threshold (NO branch of decision block 207), leaders of in the respective groups or the central server will select groups whose variances are not below the predetermined variance threshold and will execute step 209 and further steps of selecting local models for updating the global model.

Figure 5A:
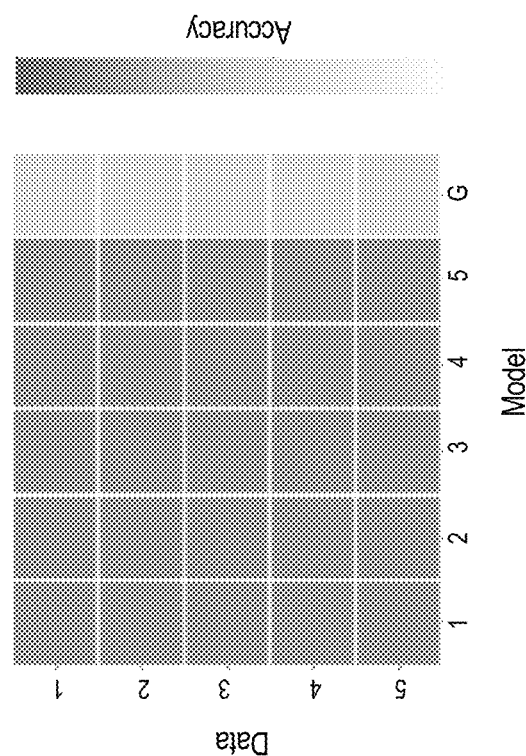
FIG. 5(A) illustrates a high variance of accuracies in a group, in accordance with one embodiment of the present invention.
Figure 5B:
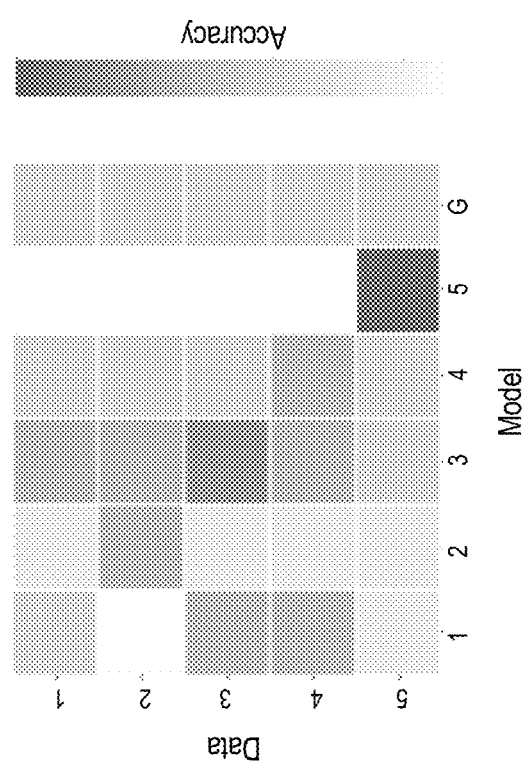
FIG. 5(B) illustrates excluding local models in a group with a low variance of accuracies, in accordance with one embodiment of the present invention.

Referring to FIG. 5(A) and FIG. 5(B), in columns, accuracies corresponding to different local models in a group (for example, the group with five local models) and a global model are presented; in rows, accuracies for each models are presented for different local data on different local devices. FIG. 5(A) illustrates a high variance of accuracies in a group, in accordance with one embodiment of the present invention. FIG. 5(B) illustrates excluding local models in a group with a low variance of accuracies, in accordance with one embodiment of the present invention. If the group is with the high variance of accuracies as shown in FIG. 5(A), the group will be further considered in following steps of selecting local models for updating the global model. However, if the group is with the low variance of accuracies as shown in FIG. 5(B), the group will be excluded.

Referring back to FIG. 2(A), at step 209, the leader or the central server compares, in each selected group whose variance is not below the predetermined variance threshold, an accuracy of each model with an average value of the accuracies.

Referring to FIG. 2(B), at step 210 (decision block 210), the leader or the central server determines whether the accuracy of each local model in a selected group exceeds a predetermined accuracy threshold. In response to determining that the accuracy of a local model exceeds the predetermined accuracy threshold (YES branch of decision block 210), at step 211, the leader or the central server excludes the local model whose accuracy exceeds the predetermined accuracy threshold. The local model whose accuracy exceeds the predetermined accuracy threshold is determined to be overfitted and excluded from uploading validation results to the central server. Optionally, the leader or the central server may also exclude a local model that is less accurate than the global model.

Referring to FIG. 2(B), in response to determining that accuracies do not exceed the predetermined accuracy threshold (NO branch of decision block 210), at step 212, the leader or the central server randomly selects, in each selected group, one or more local models whose accuracies do not exceed the predetermined threshold.

Figure 6:
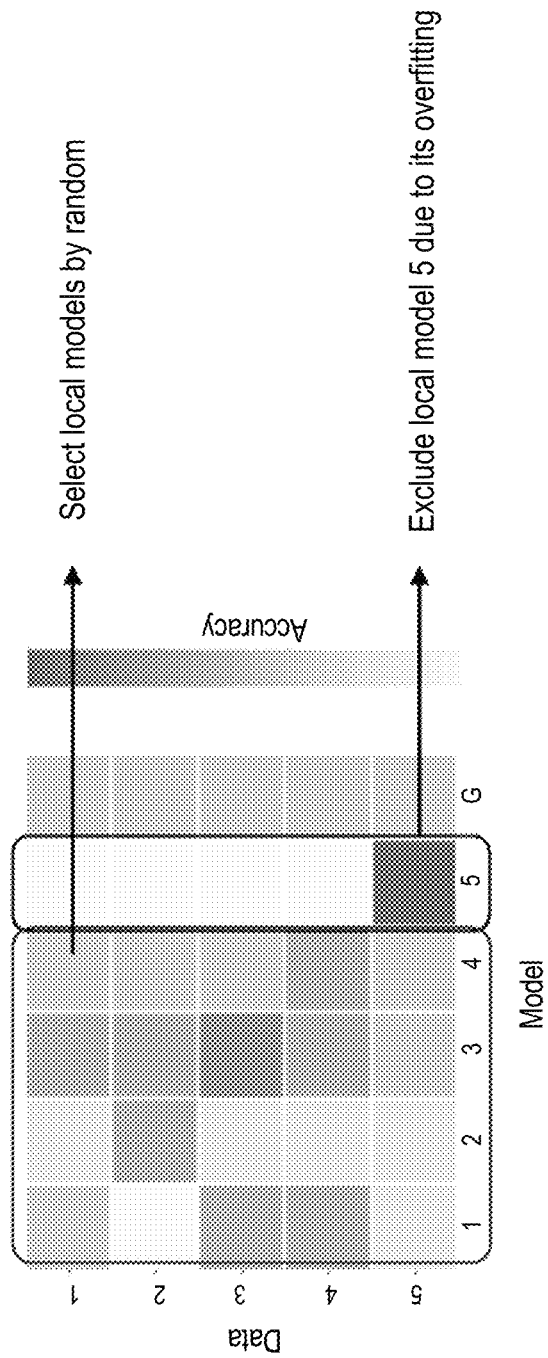
FIG. 6 illustrates randomly selecting and uploading local models in a selected group and further illustrates excluding a local model due to overfitting in a selected group, in accordance with one embodiment of the present invention.

FIG. 6 illustrates randomly selecting and uploading local models in a selected group and further illustrates excluding a local model due to overfitting in a selected group, in accordance with one embodiment of the present invention. As shown in FIG. 6, model 5 is excluded because its accuracy exceeds the predetermined accuracy threshold and it is determined to be overfitting. In the example shown in FIG. 6, local models are randomly selected from models 1, 2, 3, and 4, and the validation results of selected local models are uploaded to the central server.

Referring back to FIG. 2(B), at step 213, the central server obtains weight parameters of selected local models (which are selected at step 212). In one embodiment, the leader in each selected group sends the weight parameters of one or more selected local models in the each selected group to the central server. In another embodiment where no leader is selected, the central server receives the weight parameters of the selected local models from local devices hosting the selected local models.

Referring to FIG. 2(B), at step 214, the central server updates the global model through averaging the weight parameters uploaded from respective selected groups. At step 215 (decision block 215), the central server determines whether a convergence of updating the global model is reached. In response to determining that the convergence is reached (YES branch of decision block 215), the central server completes parallel cross validation. In response to determining that the convergence is not reached (NO branch of decision block 215), at step 216, the central server regroups the local models on the respective ones of the local devices and reiterates steps 202-215. When regrouping the local models, the central server regroups the local models in such a way that members of each group do not overlap with members of each group in a previous cycle of the parallel cross validation.

Figure 7:
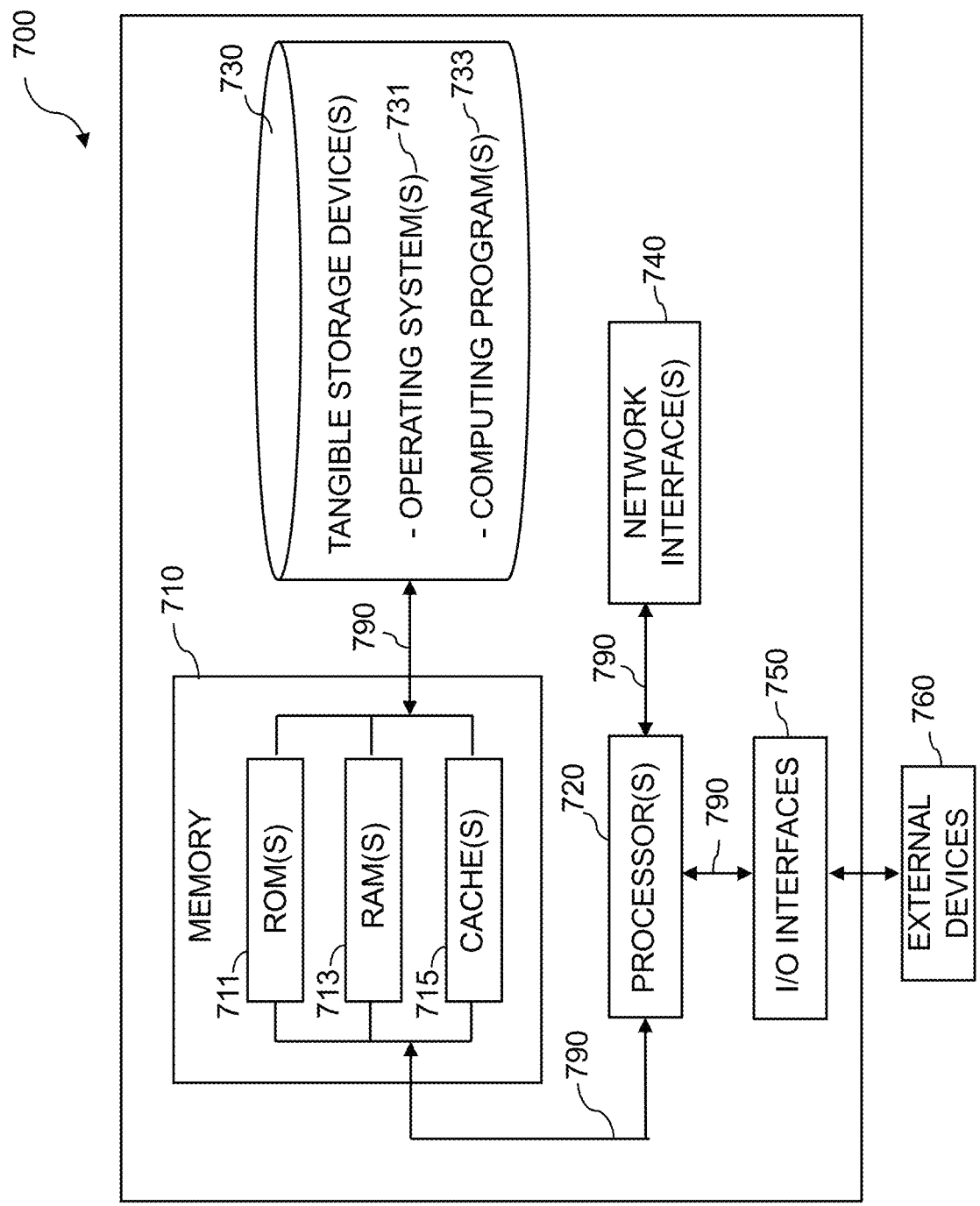
FIG. 7 is a diagram illustrating components of a computing device or server, in accordance with one embodiment of the present invention.

FIG. 7 is a diagram illustrating components of computing device or server 700, in accordance with one embodiment of the present invention. It should be appreciated that FIG. 3 provides only an illustration of one implementation and does not imply any limitations with regard to the environment in which different embodiments may be implemented.

Referring to FIG. 7, computing device or server 700 includes processor(s) 720, memory 710, and tangible storage device(s) 730. In FIG. 7, communications among the above-mentioned components of computing device or server 700 are denoted by numeral 790. Memory 710 includes ROM(s) (Read Only Memory) 711, RAM(s) (Random Access Memory) 713, and cache(s) 715. One or more operating systems 731 and one or more computer programs 733 reside on one or more computer readable tangible storage device(s) 730.

Computing device or server 700 further includes I/O interface(s) 750. I/O interface(s) 750 allows for input and output of data with external device(s) 760 that may be connected to computing device or server 700. Computing device or server 700 further includes network interface(s) 740 for communications between computing device or server 700 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
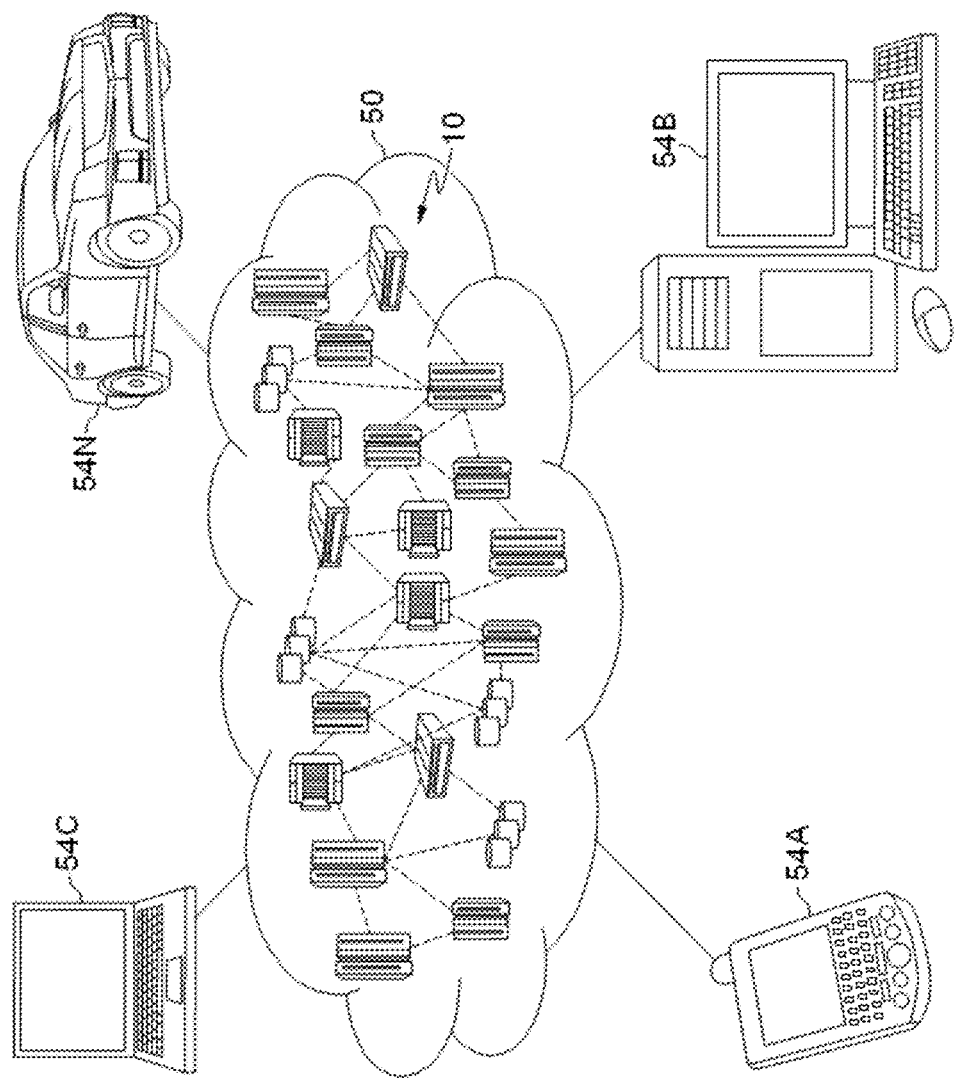
FIG. 8 depicts a cloud computing environment, in accordance with one embodiment of the present invention.

Referring now to FIG. 8, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 9:
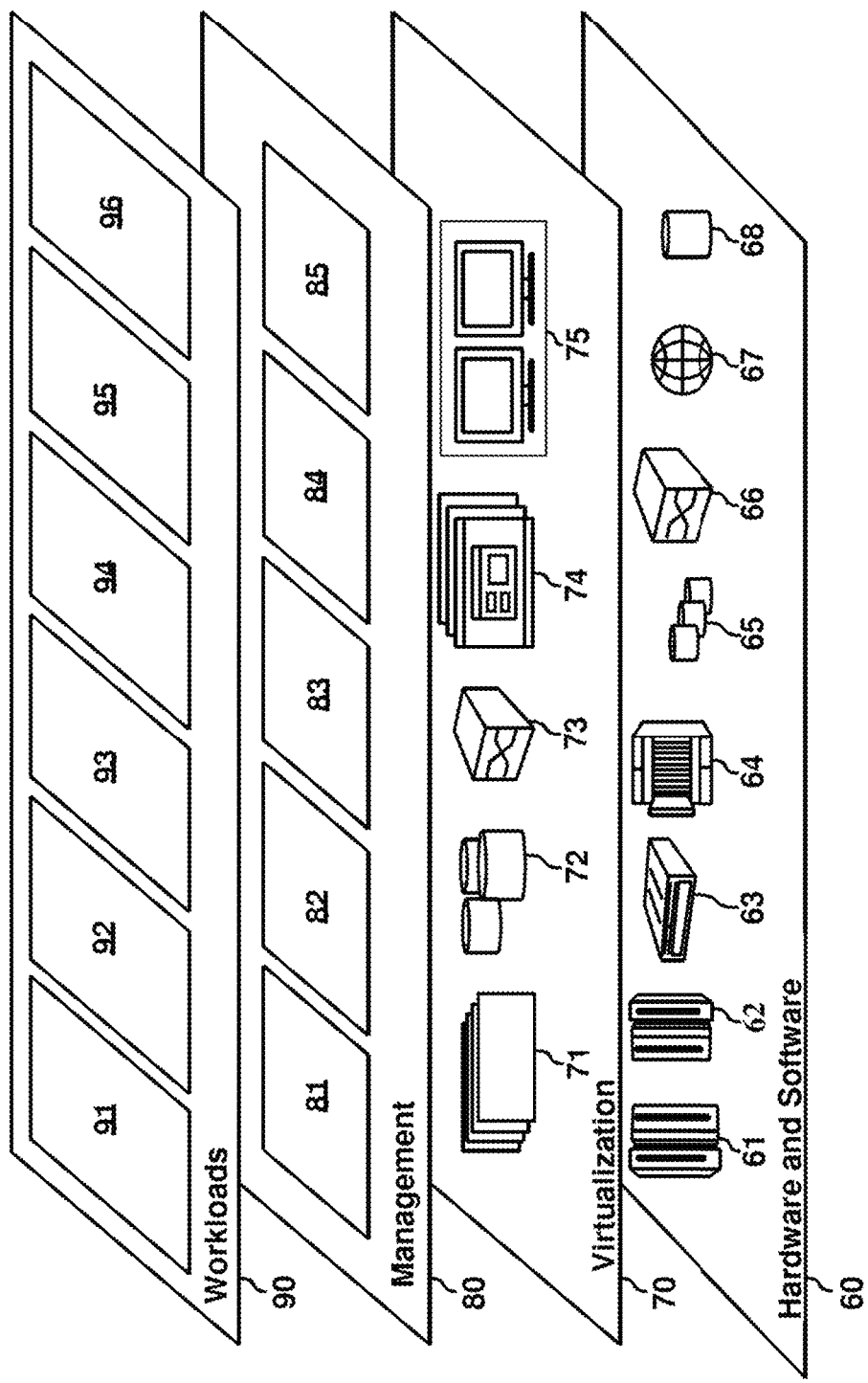
FIG. 9 depicts abstraction model layers in a cloud computing environment, in accordance with one embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of parallel cross validation in collaborative machine learning.

What is claimed is:

1. A computer-implemented method for parallel cross validation in collaborative machine learning for increasing a reliability of a global model, the method comprising:
   a plurality of groups, wherein each of the plurality of groups includes a plurality of local devices hosting respective local models;
   in each group of local models, receiving, by each local device, local models from other local devices, such that the each local device has all local models in one group;

in the each group, selecting a group leader, by local devices or by a server;

in the each group, validating, by the each local device using local data thereon, accuracies of the all local models and the global model received from the server;

in the each group, sending, by the each local device, a validation result to the group leader;

selecting, by group leaders of respective groups, groups whose variances of the accuracies are not below a predetermined variance threshold;

in each selected group, comparing, by the group leader, an accuracy of each local model and an average value of the accuracies;

in the each selected group, randomly selecting, by the group leader, one or more local models whose accuracies do not exceed a predetermined accuracy threshold;

in the each selected group, determining, by the each group leader, whether the accuracy of the each local model exceeds the predetermined accuracy threshold;

excluding, by the each group leader, any local model whose accuracy exceeds the predetermined accuracy threshold from uploading validation results to the server to prevent overfitting thereby not degrading the reliability of the global model;

sending to the server, by the leader, weight parameters of selected local models; and wherein, based on the weight parameters, the server updates the global model.

2. The computer-implemented method of claim 1, further comprising:

determining, by the group leaders of the respective groups, whether the variances in the respective groups are below the predetermined variance threshold; and in response to determining that a variance of the accuracies in a group is below the predetermined variance threshold, excluding, by a group leader of the group, the group from uploading validation results to the server.

3. The computer-implemented method of claim 1, further comprising:

grouping, by the server, the local models into the respective groups for the parallel cross validation;

wherein, in a first cycle of the parallel cross validation, the server groups the local models at random; and wherein, in later cycles of the validation, the server regroups the local models in such a way that members of the each group in a current cycle of the parallel cross validation do not overlap with members of the each group in a previous cycle of the parallel cross validation.

4. A computer program product for parallel cross validation in collaborative machine learning for increasing a reliability of a global model, the computer program product comprising a computer readable storage medium having program instructions embodied therewith, the program instructions executable by one or more processors, the program instructions executable to:

a plurality of groups, wherein each of the plurality of groups includes a plurality of local devices hosting respective local models;

in each group of local models, receive, by each local device, local models from other local devices, such that the each local device has all local models in one group;

in the each group, select a group leader, by local devices or by a server;

in the each group, validate, by the each local device using local data thereon, accuracies of the all local models and the global model received from the server;

in the each group, send, by the each local device, a validation result to the group leader;

select, by group leaders of respective groups, groups whose variances of the accuracies are not below a predetermined variance threshold;

in each selected group, compare, by the group leader, an accuracy of each local model with an average value of the accuracies;

in the each selected group, randomly select, by the group leader, one or more local models whose accuracies do not exceed a predetermined accuracy threshold;

in the each selected group, determine, by the each group leader, whether the accuracy of the each local model exceeds the predetermined accuracy threshold;

exclude, by the each group leader, any local model whose accuracy exceeds the predetermined accuracy threshold from uploading validation results to the server to prevent overfitting thereby not degrading the reliability of the global model;

send to the server, by the leader, weight parameters of selected local models; and wherein, based on the weight parameters, the server updates the global model.

5. The computer program product of claim 4, further comprising the program instructions executable to:

determine, by the group leaders of the respective groups, whether the variances in the respective groups are below the predetermined variance threshold; and in response to determining that a variance of the accuracies in a group is below the predetermined variance threshold, exclude, by a group leader of the group, the group from uploading validation results to the server.

6. The computer program product of claim 4, further comprising the program instructions executable to:

group, by the server, the local models into the respective groups for the parallel cross validation;

wherein, in a first cycle of the parallel cross validation, the server groups the local models at random; and wherein, in later cycles of the validation, the server regroups the local models in such a way that members of the each group in a current cycle of the parallel cross validation do not overlap with members of the each group in a previous cycle of the parallel cross validation.

7. A computer system for parallel cross validation in collaborative machine learning for increasing a reliability of a global model, the computer system comprising:

one or more processors, one or more computer readable tangible storage devices, and program instructions stored on at least one of the one or more computer readable tangible storage devices for execution by at least one of the one or more processors, the program instructions executable to:

a plurality of groups, wherein each of the plurality of groups includes a plurality of local devices hosting respective local models;

in each group of local models, receive, by each local device, local models from other local devices, such that the each local device has all local models in one group;

in the each group, select a group leader, by local devices or by a server;
in the each group, validate, by the each local device using local data thereon, accuracies of the all local models and the global model received from the server;
in the each group, send, by the each local device, a validation result to the group leader;
select, by group leaders of respective groups, groups whose variances of the accuracies are not below a predetermined variance threshold;
in each selected group, compare, by the group leader, an accuracy of each local model with an average value of the accuracies;
in the each selected group, randomly select, by the group leader, one or more local models whose accuracies do not exceed a predetermined accuracy threshold;
in the each selected group, determine, by the each group leader, whether the accuracy of the each local model exceeds the predetermined accuracy threshold;
exclude, by the each group leader, any local model whose accuracy exceeds the predetermined accuracy threshold from uploading validation results to the server to prevent overfitting thereby not degrading the reliability of the global model;
send to the server, by the leader, weight parameters of selected local models; and
wherein, based on the weight parameters, the server updates the global model.

8. The computer system of claim 7, further comprising the program instructions executable to:
determine, by the group leaders of the respective groups, whether the variances in the respective groups are below the predetermined variance threshold; and
in response to determining that a variance of the accuracies in a group is below the predetermined variance threshold, exclude, by a group leader of the group, the group from uploading validation results to the server.

9. The computer system of claim 7, further comprising the program instructions executable to:
group, by the server, the local models into the respective groups for the parallel cross validation;
wherein, in a first cycle of the parallel cross validation, the server groups the local models at random; and
wherein, in later cycles of the validation, the server regroups the local models in such a way that members of the each group in a current cycle of the parallel cross validation do not overlap with members of the each group in a previous cycle of the parallel cross validation.

10. A computer-implemented method for parallel cross validation in collaborative machine learning for increasing a reliability of a global model, the method comprising:
grouping local models on local devices into groups for the parallel cross validation, wherein each local device within each group receives a local model from each other local device in the group, wherein each local device within each group uses local data to validate accuracies of all local models in the group;
selecting each group of local models whose variance of accuracies is not below a predetermined variance threshold;
comparing an accuracy of each local model with an average value of accuracies for each selected group of local models;
randomly selecting one or more local models for each selected group of local models whose accuracies do not exceed a predetermined accuracy threshold;
obtaining weight parameters from the selected one or more local models for each selected group of local models;
updating the global model through averaging the weight parameters uploaded from respective selected groups of local models; and
excluding each group of local models whose variance of accuracies is below the predetermined variance threshold thereby not degrading the reliability of the global model.

11. The computer-implemented method of claim 10, further comprising:
receiving validation results from each local device within each group; and
calculating a variance of accuracies for local models within each group based on the received validation results.

12. The computer-implemented method of claim 10, further comprising:
completing the parallel cross validation in response to reaching a convergence of updating the global model.

13. The computer-implemented method of claim 10, further comprising:
regrouping the local models on the local devices into groups in a different manner for the parallel cross validation in response to not reaching a convergence of updating the global model.

14. A computer program product for parallel cross validation in collaborative machine learning for increasing a reliability of a global market, the computer program product comprising one or more computer readable storage mediums having program instructions embodied therewith, the program instructions executable by one or more processors, the program instructions executable for:
grouping local models on local devices into groups for the parallel cross validation, wherein each local device within each group receives a local model from each other local device in the group, wherein each local device within each group uses local data to validate accuracies of all local models in the group;
selecting each group of local models whose variance of accuracies is not below a predetermined variance threshold;
comparing an accuracy of each local model with an average value of accuracies for each selected group of local models;
selecting one or more local models for each selected group of local models whose accuracies do not exceed a predetermined accuracy threshold;
obtaining weight parameters from the selected one or more local models for each selected group of local models;
updating the global model through averaging the weight parameters uploaded from respective selected groups of local models; and
excluding each group of local models whose variance of accuracies is below the predetermined variance threshold thereby not degrading the reliability of the global model.

15. The computer program product of claim 14, further comprising the program instructions executable for:
receiving validation results from each local device within each group; and
calculating a variance of accuracies for local models within each group based on the received validation results.

16. The computer program product of claim 14, further comprising the program instructions executable for:
    completing the parallel cross validation in response to reaching a convergence of updating the global model.

17. The computer program product of claim 14, further comprising the program instructions executable for:
    regrouping the local models on the local devices into groups in a different manner for the parallel cross validation in response to not reaching a convergence of updating the global model.

* * * * *